July 10, 1956

F. J. FINKENAUER, JR., ET AL 2,754,469

GENERATOR REGULATING SYSTEM

Filed July 15, 1953

INVENTORS.
Frederick J. Finkenauer, Jr.
Omer E. Bowlus.
BY
Harness and Harris
ATTORNEYS.

INVENTORS.
Frederick J. Finkenauer, Jr.
Omer E. Bowlus.
BY
Harness and Harris
ATTORNEYS.

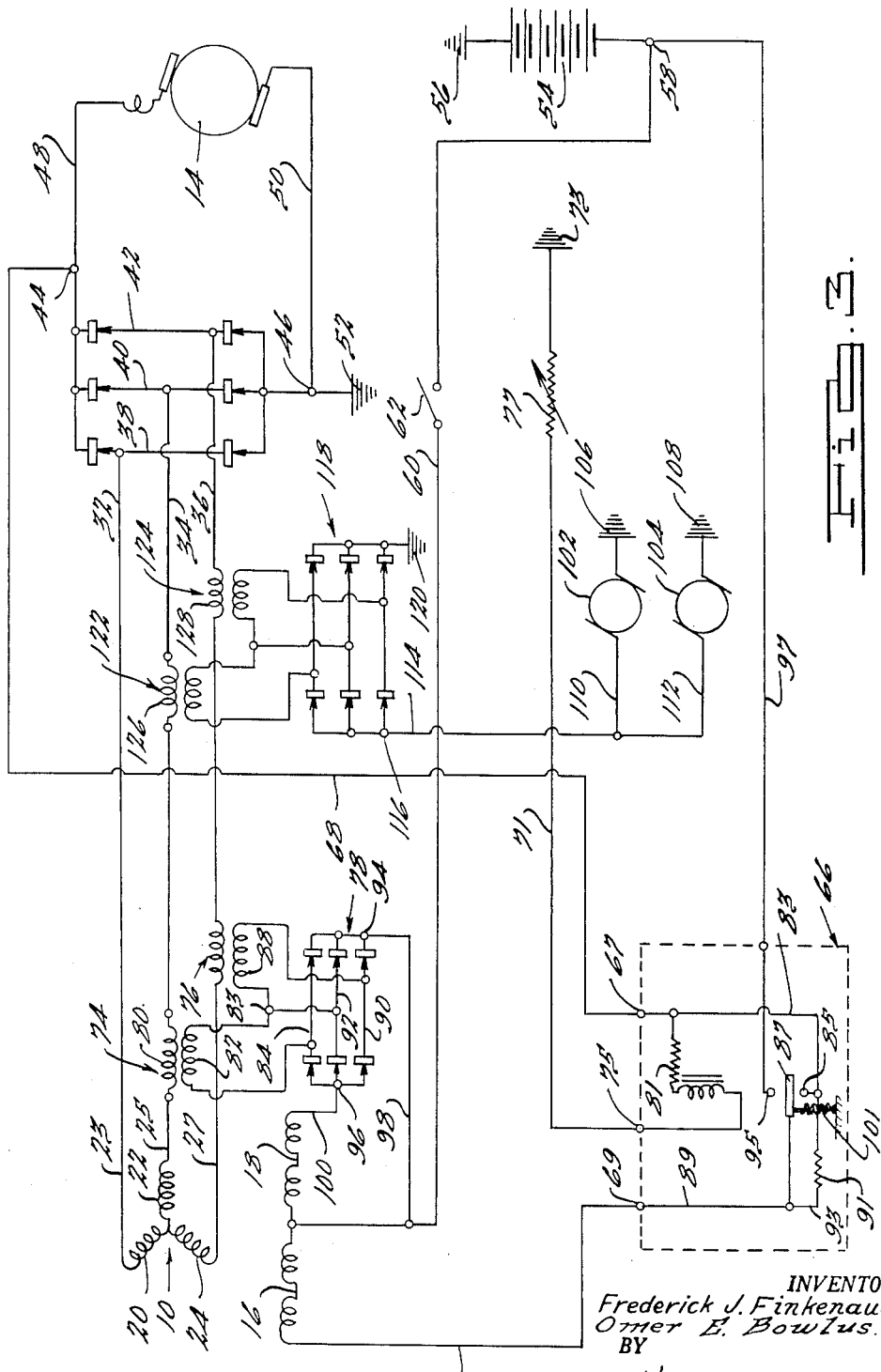

United States Patent Office 2,754,469
Patented July 10, 1956

2,754,469
GENERATOR REGULATING SYSTEM

Frederick J. Finkenauer, Jr., Birmingham, and Omer E. Bowlus, Detroit, Mich., assignors to Chrysler Corporation, Highland Park, Mich., a corporation of Delaware Application July 15, 1953, Serial No. 368,174
2 Claims. (Cl. 322—25)

This invention relates to an electrical system in which an alternating current generator delivers current to a main load device and, in addition, delivers current to a supplemental load device, the last mentioned current being delivered in proportion to the main load current.

It is a principal object of this invention to utilize current transformers and a rectifier to deliver current to a supplemental load device. The supplemental load device referred to may be in the form of field windings of the generator or additional motor driven accessories.

This invention will be described in connection with an automobile air conditioning system as that is the application for which it has been primarily designed although it is to be understood that it is also applicable to electrical systems used in conjunction with other devices. In automobile air conditioning devices it is sometimes desirable to locate the compressor remote from the automobile engine and in such an installation it is desirable to provide an electric drive for the compressor and to use an engine driven alternating current generator as a source of current. Our invention is particularly adapted for use in such installations.

It is an additional object of the invention to use current transformers and a rectifier to excite a portion of the generator field to increase the generator capacity, particularly at low generator speeds and in proportion to the load current delivered by the alternating current generator.

It is a further object of the invention to reduce load on an automobile battery by driving direct current motors, such as the evaporator blower motor and the condenser blower motor of an automobile air conditioner, from an alternating current generator by means of current transformers and a rectifier and to supply current to these motors that is proportional to the load on the alternating current generator. In installations where the load is substantially constant this assures that the blowers will operate at substantially constant speeds.

In the drawings:

Fig. 3 is a wiring diagram showing an electric drive for two supplemental motors superimposed on the wiring diagram of Fig. 1.

Figure 1:
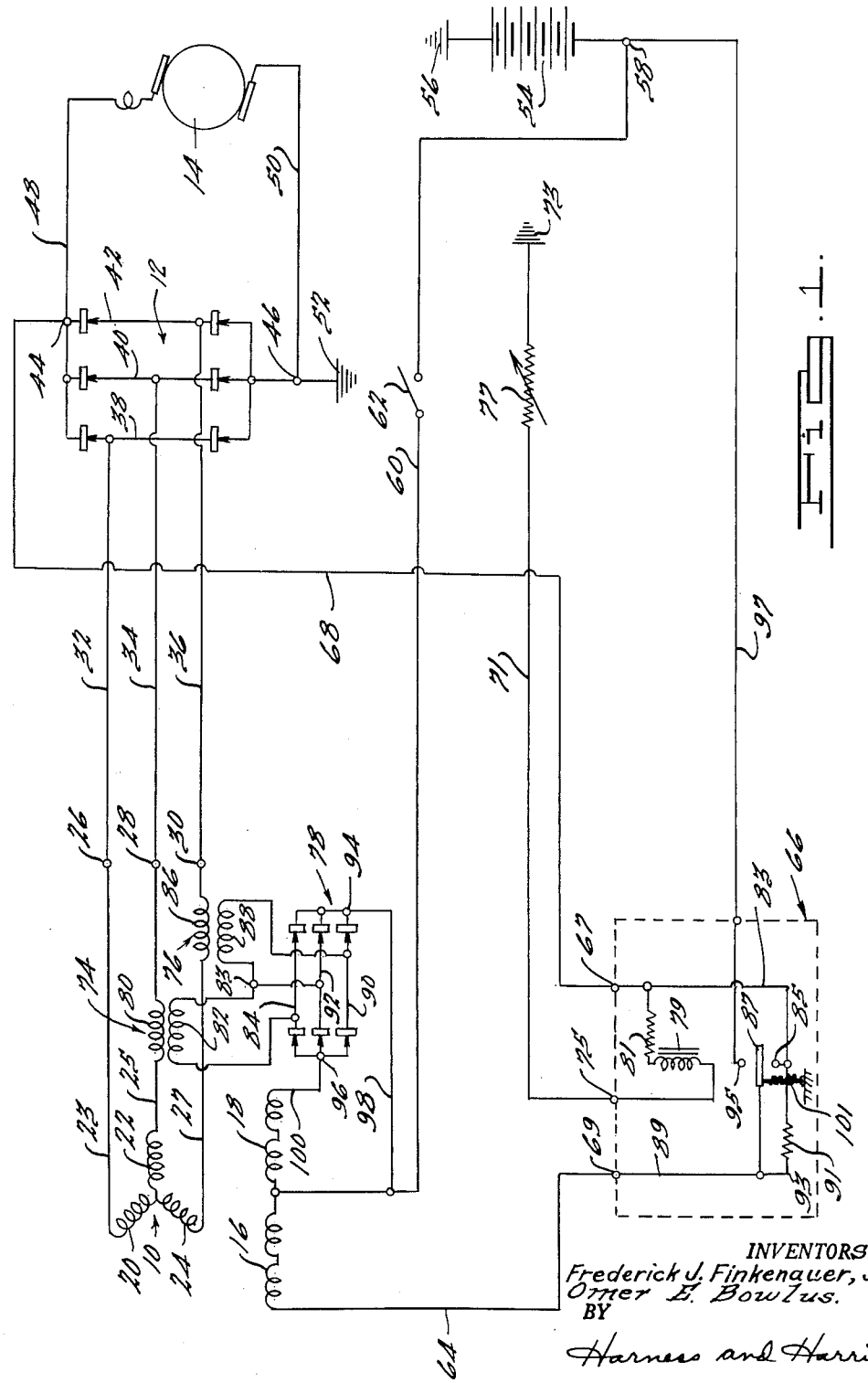
Fig. 1 is a wiring diagram showing an electrical generating system having the present invention embodied therein to contribute to the excitation of the field of an alternating current generator.

In Fig. 1 of the drawings an alternating current generator 10 delivers current through a main rectifier 12 to a direct current load which is represented by a series wound direct current motor 14. In an automobile air conditioning application of the invention it is intended that the motor 14 drive a refrigeration compressor which is not shown herein. In addition, it is intended that the alternating current generator be driven by any suitable mechanical connection with the automobile engine such as by a belt, chain or gears.

The alternating current generator 10 has field windings 16 and 18, which are preferably mounted on a rotor, and three phase Y connected inductor windings 20, 22 and 24, which are preferably on a stator. The stator of the generator 10 has conductors 23, 25 and 27 which connect it with alternating current terminals 26, 28 and 30 and these terminals are connected with rectifier 12 by means of conductors 32, 34 and 36.

The main rectifier 12 is here shown as a three phase, full-wave bridge type of rectifier having three circuit arms 38, 40 and 42 with which the terminals 26, 28 and 30 are connected, respectively, by the conductors 32, 34 and 36. The main rectifier 12 also has direct current terminals 44 and 46 with which the motor 14 is connected by the conductors 48 and 50. The terminal 46 of rectifier 12 is grounded at 52.

The field winding 16 of the alternating current generator is energized by a field circuit that includes a storage battery 54 which is grounded at 56 and provided with a terminal 58 that is connected to field winding 16 by a conductor 60 which has a manually operable switch 62 interposed therein. In an automobile air conditioning unit the switch 62 provides the operator with a control by means of which the air conditioning unit can be started and stopped. A conductor 64 connects the field winding 16 of the alternating current generator with a vibrating reed type of voltage regulator 66 which provides a circuit to a conductor 68 that is connected to the output terminal 44 of main rectifier 12 which is grounded at 52. There is thus provided a circuit from battery 54 for the initial energization of the field winding 16 so that current will be generated in inductor windings 20, 22 and 24 as the automobile engine drives the rotor of the alternating current generator 20. The output of main rectifier 12 provides a rapid build up of current in winding 16 by delivering rectified alternating current from the generator output through conductors 32, 34 and 36 to rectifier 12 and conductor 68 and through voltage regulator 66 to conductor 64 which is connected to field winding 16. Winding 16 is, of course, grounded at 56 through conductor 60 and battery 54.

The voltage regulator 66 is of conventional construction and attempts to maintain the load voltage between conductors 48 and 50 at a predetermined value. We have placed the voltage regulator in a circuit that includes the field winding 16, but does not include the field winding 18. The voltage regulator includes terminal 67 to which the conductor 68 is connected and a terminal 69 to which the conductor 64 is connected. In addition, a conductor 71 which is grounded at 73 is connected to a third terminal 75 and an adjustable voltage control 77 is interposed in conductor 71.

A solenoid 79 in voltage regulator 66 is connected to terminal 75 and through a conductor 81 is connected to terminal 67. A conductor 83 is connected to a contact 85 which is adapted to engage a movable contact 87 which is connected to terminal 69 by a conductor 89. A resistance 91 is included in a shunt circuit 93 which connects conductor 83 and conductor 89 so that when contact 87 is moved out of contact with contact 85 a resistance is interposed in the circuit connecting rectifier 12 and field winding 16. When the voltage exceeds a predetermined value selected by adjustable voltage control 77 the solenoid 79 is capable of lifting contact 87 away from contact 85. However, when this occurs the resistance 91 reduces the excitation of field 16 and the generator output which in turn reduces the voltage imparted to the solenoid and the contact 87 is returned by a spring 101 to contact 85. Contact 87 thus shunts off and on contact 85 to maintain a predetermined voltage. Should the voltage ever become excessively high due to generator speed the solenoid 79 will pull contact 87 into contact with a third contact 95 which is connected by conductors 60 and 97 to winding 16 thereby shorting the winding 16 and collapsing the voltage across it.

The main rectifier 12 and direct current motor 14 act as a load on the output of the generator 10. It has been found, however, that if the battery 54 and generator 10 are of economical size that at low generator speeds the voltage provided by rectifier 12 and battery 54 to field winding 16 is insufficient for the generator to build up and reach the desired load voltage. Such a condition would interfere with the initial starting of motor 14 and carrying the load at low generator speeds even if starting of the motor is overcome. For example, in the automobile air conditioning system it has been found to be desirable to operate motor 14 at about 115 amperes at 30 volts and, in the absence of our invention, a load of this magnitude would require a large generator which is uneconomical. We, therefore, provide a supplemental means to over excite the field of a small generator and boost its capacity.

The supplemental means to over excite the field of generator 10 includes a pair of current transformers 74 and 76, an auxiliary rectifier 78 and field winding 18. Current transformer 74 has its primary winding 80 interposed in conductor 25 and its secondary winding 82 connected to a terminal 83 and one circuit arm 84 of the three phase full-wave bridge type of rectifier 78. The other current transformer 76 has its primary winding 86 interposed in conductor 27 and its secondary winding 88 connected to the terminal 83 and another circuit arm 90 of rectifier 78. The terminal 83 is connected to a third circuit arm 92 of rectifier 78. The rectifier 78 has direct current terminals 94 and 96 which are respectively connected by conductors 98 and 100 with conductor 60 and field winding 18 so that field winding 18 is energized by rectified alternating current derived from current transformers 74 and 76. Thus, as the output of generator 10 increases due to the excitation of field winding 16 by battery 54 and rectifier 12, the current transformers 74 and 76 and rectifier 78 excite field winding 18 to greatly increase the capacity of generator 10.

One known characteristic of current transformers is that the current in the secondary winding is in direct proportion to the current in the primary winding. If the supplemental circuit including transformers 74 and 76 and rectifier 78 was not present the load 14 would bleed the generator output so severely that the field excitation and generator output would be unable to build up adequately. However, with our improved circuit for energizing field winding 18 the field is increased in proportion to the load drawn.

Figure 2:
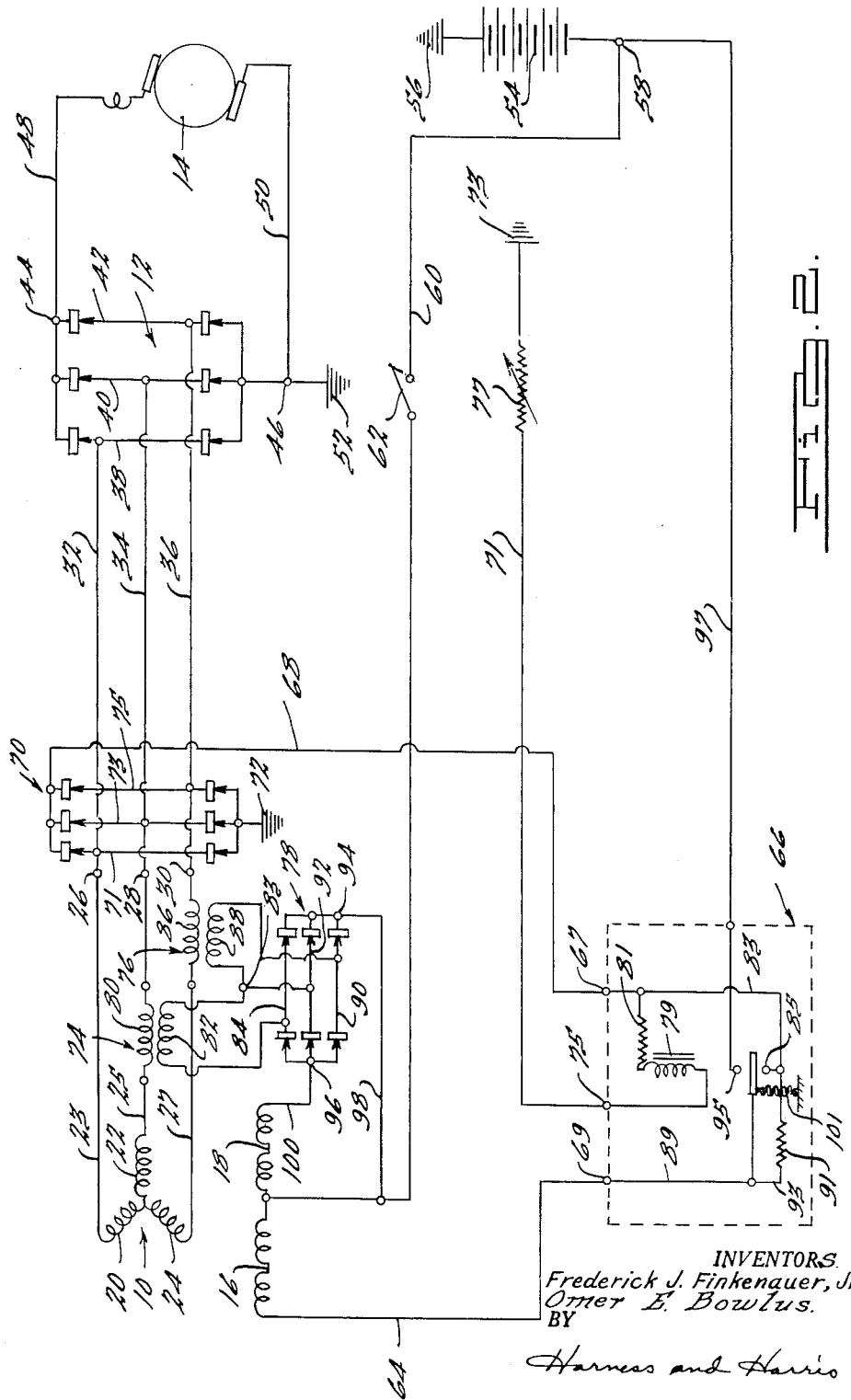
Fig. 2 is a modified wiring diagram in which a separate rectifier is used in the voltage control of the generator output.

Figure 2 illustrates a slight modification of Fig. 1 in which the conductor 68' from voltage regulator 66 is connected to an auxiliary rectifier 70 which is grounded at 72. This construction merely substitutes rectifier 70 for the connection of conductor 68 to terminal 44 of rectifier 12 in Figure 1. Rectifier 70 has three circuit arms 71, 73 and 75, which are respectively connected to conductors 32, 34 and 36 carrying the generator output.

Figure 3 illustrates another application of our invention wherein our invention is used to drive supplemental direct current motors such as the evaporator and condenser blowers of an automobile air conditioning system. The electrical circuit of Fig. 1 is repeated in Fig. 3, but a pair of direct current motors and their electrical drive are superimposed thereon. The numerals used in Fig. 1 have been repeated in Fig. 3, but repetition of the description thereof is believed to be unnecessary.

Direct current motors 102 and 104 are grounded respectively at 106 and 108. These motors may be operatively connected, for example, to drive the evaporator and condenser blowers of an automobile air conditioning system. The direct current motors 102 and 104 are connected respectively by conductors 110 and 112 to a conductor 114 which in turn is connected to a terminal 116 of a three phase, full-wave, bridge type of rectifier 118 which is similar to the rectifiers 12, 70 and 78 described above. The rectifier 118 is grounded at 120.

Alternating current which is derived from the output of generator 10 is delivered to rectifier 118 by a pair of current transformers 122 and 124 which are similar to current transformers 74 and 76, previously described herein. Current transformer 122 has its primary winding 126 interposed in conductor 34 and current transformer 124 has its primary winding 128 interposed in conductor 36. The secondary windings of current transformers 122 and 124 are connected to the three circuit arms of rectifier 118 as illustrated. A description of these connections is not believed to be necessary as they duplicate the connections of transformers 74 and 76 with rectifier 78, as described above. Alternating current delivered by transformers 122 and 124 is thus rectified by rectifier 118 and used to drive direct current motors 102 and 104.

It is desirable in automobile air conditioning systems to have the motors 102 and 104, which drive the condenser and evaporator blowers, run at constant speed and this is accomplished by the drive described herein, because even though the automobile engine which drives generator 10 does not operate at constant speed the compressor motor 14 draws a substantially constant load and the current transformers 122 and 124 deliver current to the rectifier 118 that is in direct proportion to the current in their respective primary windings.

We claim:

1. In an electrical system, an alternator adapted to be driven by a variable spaced source of power, said alternator having first and second field windings and polyphase alternating current terminals, a polyphase main rectifier connected with said alternator and having direct current load terminals, a load circuit connected with said direct current load terminals, a direct current circuit connected to said direct current load and to said first field winding for excitation thereof, said direct current circuit including a voltage regulator for regulating the voltage of said first field winding, apparatus for exciting said second field winding including a polyphase, full wave, bridge type second rectifier having direct current terminals with which said second field winding is connected and alternating current terminals and current transformers each having a primary winding interposed in the connection between the alternating current terminals of said alternator and said main rectifier, said transformers each having a secondary winding connected to the alternating current terminals of said second rectifier.

2. In an electrical system, an alternator adapted to be driven by a variable speed source of power, said alternator having first and second field windings and polyphase alternating current terminals, a polyphase main rectifier connected with each of the terminals of said alternator, said main rectifier having direct current load terminals, a load circuit connected with said direct current load terminals, a direct current circuit connected to said first field winding for excitation thereof, said direct current circuit being arranged in parallel with said load circuit, a vibrating reed type of voltage regulating device in said direct current circuit which, through control of said first field winding, controls the voltage of said load circuit, apparatus for exciting said second field winding including a polyphase, full wave, bridge type second rectifier having direct current terminals with which said second field winding is connected and alternating current terminals and two current transformers each having a primary winding inporposed in the connection between one of the terminals of said alternator and said main rectifier, said transformers each having a secondary winding and alternating current circuit means connecting said secondary windings with the alternating current terminals of said second rectifier.

References Cited in the file of this patent

UNITED STATES PATENTS

| | | |
|---|---|---|
| 2,412,442 | Crever et al. | Dec. 10, 1946 |
| 2,549,305 | Graybrook et al. | Apr. 17, 1951 |
| 2,594,730 | Cassidy | Apr. 29, 1952 |